United States Patent
Mironica

(10) Patent No.: US 11,393,072 B2
(45) Date of Patent: Jul. 19, 2022

(54) METHODS AND SYSTEMS FOR AUTOMATICALLY CORRECTING IMAGE ROTATION

(71) Applicant: Adobe Inc., San Jose, CA (US)

(72) Inventor: Ionut Mironica, Bucharest (RO)

(73) Assignee: Adobe Inc., San Jose, CA (US)

( * ) Notice: Subject to any disclaimer, the term of this patent is extended or adjusted under 35 U.S.C. 154(b) by 230 days.

(21) Appl. No.: 16/913,198

(22) Filed: Jun. 26, 2020

(65) Prior Publication Data

US 2021/0407045 A1 Dec. 30, 2021

(51) Int. Cl.
| | |
|---|---|
| G06T 3/60 | (2006.01) |
| G06T 3/40 | (2006.01) |
| G06T 5/00 | (2006.01) |
| G06T 5/50 | (2006.01) |
| G06N 3/08 | (2006.01) |
| G06N 3/04 | (2006.01) |

(Continued)

(52) U.S. Cl.
CPC ............. *G06T 3/60* (2013.01); *G06N 3/0481* (2013.01); *G06N 3/084* (2013.01); *G06N 20/00* (2019.01); *G06T 3/40* (2013.01); *G06T 5/009* (2013.01); *G06T 5/50* (2013.01); *G06T 11/60* (2013.01); *G06T 2207/20081* (2013.01); *G06T 2207/20084* (2013.01)

(58) Field of Classification Search
CPC .. G06T 3/60; G06T 3/40; G06T 5/009; G06T 5/50; G06T 11/60; G06T 2207/20081; G06T 2207/20084; G06N 3/0481; G06N 3/084; G06N 20/00
See application file for complete search history.

(56) References Cited

U.S. PATENT DOCUMENTS

| | | | |
|---|---|---|---|
| 2021/0287092 A1* | 9/2021 | Nie | G06V 10/82 |
| 2021/0406576 A1* | 12/2021 | Whitestone | G06V 10/82 |

(Continued)

FOREIGN PATENT DOCUMENTS

WO WO-2019031503 A1 * 2/2019 ........... B60C 11/246

OTHER PUBLICATIONS

Karakottas, Antonis, et al. "360D: a dataset and baseline for dense depth estimation from 360 images." 1st Workshop on 360oPerception and Interaction, European Conference on Computer Vision (ECCV), Munich, Germany. 2018. (Year: 2018).*

(Continued)

*Primary Examiner* — Charles T Shedrick
(74) *Attorney, Agent, or Firm* — FIG. 1 Patents

(57) ABSTRACT

Systems and methods are disclosed for automatically correcting a rotation of an image. One method comprises receiving an input image to be processed for rotation correction, and providing the input image to a machine learning model configured to predict a rotation angle and an orientation of an image. The machine learning model may comprise a convolutional neural network utilizing one or more rectangle-shaped filters to extract features from the input image. A rotation angle may be determined using a first branch of fully connected layer configured for a regression task of the machine learning model, and an orientation of the image may be determined using a second branch of fully connected layer configured for a classification task of the machine learning model. The input image may then be rotated based on the determined rotation angle and orientation.

20 Claims, 9 Drawing Sheets

(51) Int. Cl.
G06N 20/00 (2019.01)
G06T 11/60 (2006.01)

(56) References Cited

U.S. PATENT DOCUMENTS

2021/0407045 A1* 12/2021 Mironica ............... G06T 3/40
2022/0036115 A1* 2/2022 Huang .................. G06T 3/60

OTHER PUBLICATIONS

Mironica, Ionut, and Andrei Zugravu. "A Fast Deep Learning Network for Automatic Image Auto-Straightening." arXiv preprint arXiv: 2105.05787 (2021). (Year: 2021).*

Alex Krizhevsky et al. "Imagenet classification with deep convolutional neural networks", Conference of Advances in neural information processing systems, 2012.

Andrew G. Howard et al. MobileNets: MobileNets: Efficient Convolutional Neural Networks for Mobile Vision Applications, Apr. 2017.

C. Szegedy et al., "Rethinking the inception architecture for computer vision". In The IEEE Conference on Computer Vision and Pattern Recognition (CVPR) (Jun. 2016).

Chi Yoon Jeong et al., "Fast horizon detection in maritime images using region-of-interest", International Journal of Distributed Sensor Networks, 2018, https://doi.org/10.1177/1550147718790753.

Chollet, F., et al. Keras. https://keras.io, 2015.

Evgeny Gershikov et al. "Horizon Line Detection in Marine Images: Which Method to Choose?", International Journal on Advances in Intelligent Systems, 2013; 6(1 and 2): 79-88.

F. Iandola et al, DenseNet: Implementing Efficient ConvNet Descriptor Pyramids. In arXiv preprint arXiv:1404.1869 (2016).

Fischer et al. "Image orientation estimation with convolutional networks", vol. 9358, pp. 368-378.

G. Ciocca et al. "Image orientation detection using lbp-based features and logistic regression" Multimedia Tools and Applications 74 (Jan. 2013), 1-22.

Gao Huang et al. "Densely Connected Convolutional Networks", The IEEE Conference on Computer Vision and Pattern Recognition (CVPR), 2017.

Greg Olmschenk et al. "Pitch and Roll Camera Orientation from a Single 2D Image Using Convolutional Neural Networks", 14th Conference on Computer and Robot Vision (CRV), 2017.

He et al. "Deep residual learning for image recognition". In The IEEE Conference on Computer Vision and Pattern Recognition (CVPR) (Jun. 2016).

J. Luo et al., "Psychophysical study of image orientation perception". Spatial vision 16 (Feb. 2003), p. 429-57.

Kunal Swami et al. "Why my photos look sideways or upside down? Detecting Canonical Orientation of Images using Convolutional Neural Networks", 2017 IEEE International Conference on Multimedia & Expo Workshops (ICMEW).

L. Wang et al., "Image orientation detection with integrated human perception cues (or which way is up)", vol. 2, pp. II-539.

Lee et al. "Automatic upright adjustment of photographs with robust camera calibration", IEEE transactions on pattern analysis and machine intelligence, 2013.

Lipschutz et al. "New methods for horizon line detection in infrared and visible sea images.", Mar. 2013.

Russakovsky et al., "ImageNet Large Scale Visual Recognition Challenge". International Journal of Computer Vision (IJCV) 115, 3 (2015), 211-252.

Sandler et al. "Mobilenetv2: Inverted residuals and linear bottlenecks". In 2018 IEEE/CVF Conference on Computer Vision and Pattern Recognition (2018).

Tomasz Praczyk, "A quick algorithm for horizon line detection in marine images", Journal of Marine Science and Technology, 2018. https://doi.org/10.1007/s00773-017-0464-8.

Ujash Joshi et al "Automatic Photo Orientation Detection with Convolutional Neural Networks", 14th Conference on Computer and Robot Vision (CRV).

* cited by examiner

METHODS AND SYSTEMS FOR AUTOMATICALLY CORRECTING IMAGE ROTATION

TECHNICAL FIELD

The present disclosure relates to systems and methods for image analysis and correction. More particularly, the present disclosure relates to systems and methods for automatically correcting image rotation by utilizing a machine learning model.

BACKGROUND

Correcting the rotation of images so the images are "straightened" or "upright" in the correct orientation is a frequent task for many photographers. Under certain circumstances, the task of correcting image rotation may be complicated even for the human eye. For example, when the horizon line, or other horizontal and vertical lines are missing in the image, it may be difficult for a human observer to determine precisely the degree by which the image needs to be rotated.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for automatically correcting image rotation by utilizing a machine learning model. The machine learning model contemplated in the present disclosure is a deep neural network utilizing a convolutional neural network configured to detect a rotation angle and an orientation of an image. In particular, the convolutional neural network may use rectangle-shaped depthwise convolutions, which may be better suited for detecting long lines in an image. An adapted loss function accounting for both classification and regression loss may complement the deep neural network, in order to optimize parameter values by identifying the difference between the network output and its expected output and enabling back-propagation. Notably, the regression loss portion of the loss function may include multiple terms, with one of the terms penalizing the network when the predicted orientation of an image is incorrect, which may be one of the most disturbing errors in the image rotation correction task.

In one aspect, a computer-implemented method for automatically correcting a rotation of an image is provided. The computed-implemented method comprises: receiving an input image to be processed for rotation correction; providing the input image to a machine learning model configured to predict a rotation angle and an orientation of an image, the machine learning model comprising a convolutional neural network utilizing one or more rectangle-shaped filters; determining a rotation angle of the input image using a first branch of fully connected layer configured for a regression task of the machine learning model; determining an orientation of the input image using a second branch of fully connected layer configured for a classification task of the machine learning model; and rotating the image based on the determined rotation angle and orientation.

In another aspect, a computer-implemented method for automatically correcting a rotation of an image is provided. The computer-implemented method comprises: receiving an input image to be processed for rotation correction; preparing the input image for feature extraction; extracting a plurality of features from the input image using a machine learning model comprising one or more straighten bottleneck residual blocks, each of the one or more straighten bottleneck residual blocks comprising a rectangle-shaped filter; determining a rotation angle of the input image based on the plurality of extracted features using a first branch of fully connected layer of the machine learning model; determining an orientation of the input image based on the plurality of extracted features using a second branch of fully connected layer of the machine learning model; and rotating the input image based on the determined rotation angle and orientation.

In another aspect, a system for automatically correcting a rotation of an image is provided. The system comprises one or more processors; and one or more computer readable media storing instructions which, when executed by the one or more processors, cause the one or more processors to perform operations comprising: receiving an image to be processed for rotation correction; providing the input image to a machine learning model configured to predict a rotation angle and an orientation of an image, the machine learning model comprising a convolutional neural network utilizing one or more rectangle-shaped filters; determining a rotation angle of the input image using a first branch of fully connected layer configured for a regression task of the machine learning model; determining an orientation of the input image using a second branch of fully connected layer configured for a classification task of the machine learning model; and rotating the image based on the determined rotation angle and orientation.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
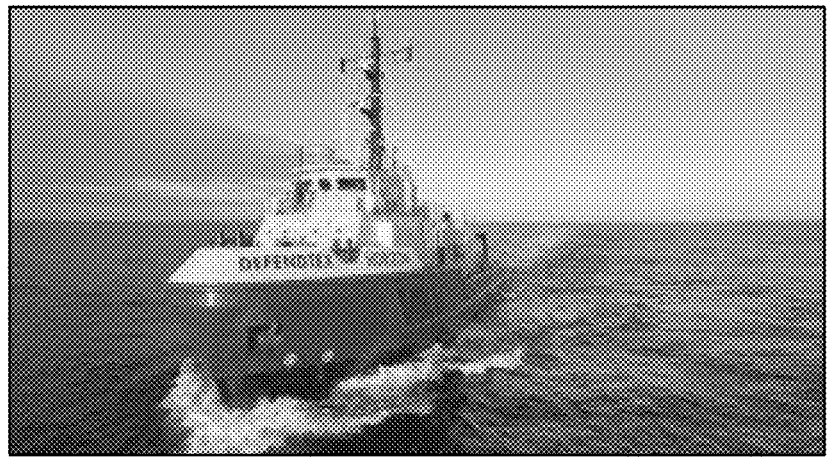
FIG. 1 shows an exemplary image that includes a horizon line, to which a horizon line detection technique may be applied to correct image rotation.

The following embodiments describe systems and methods for image analysis and correction and, more particularly, for automatically correcting image rotation by utilizing a machine learning model.

Image rotation correction is a routine and rather tedious task for many photographers, and the rotation correction feature is one of the most used tools in photo editing software products, such as Adobe Photoshop and Lightroom. Photos casually shot by hand-held cameras or phones may appear tilted. The human eyes are sensitive to tilted images even when the rotation angle is small. Modern cameras and phones are implemented with inertial sensors which can be used to correct image rotation, but they may only be able to correct the rotation in ninety (90) degree increments, and they may not be able to detect small angle errors which may still be irritating to human perception.

Detection of a rotation angle of a tilted image requires a thorough, high level understanding of the scene captured in the image. Humans use object recognition and contextual scene information to correctly orient images. However, rotation correction might not be easy even for humans. Accuracy in detecting image rotation angles can be very high when using all available semantic cues from high resolution images, but accuracy declines when using low-level vision features and coarse semantics from low resolution images.

Therefore, there is a need for improved systems and methods for automatically correcting a rotation of an image, with an accuracy comparable to or even better than that of a human. The current disclosure proposes a machine learning model, namely a deep neural network architecture that is designed to automatically correct image rotation based on visual data with high accuracy. The deep neural network architecture contemplated in the current disclosure may comprise a convolutional neural network and may utilize rectangle-shaped depthwise convolutions (i.e., filters or kernels), which are specialized in detecting long lines in an image. Further, an adapted loss function may complement the deep neural network to penalize prediction errors, accounting for both classification and regression loss. The machine learning model may be adaptable to portable devices and may be run in real time for both pictures and videos.

Compared to other methods that are able to detect rotation errors only in a limited set of image categories such as images containing man-made structures and/or horizon lines, the techniques disclosed in the present disclosure may be effective against a larger variety of images including, but not limited to, portraits, landscapes, sports, night photos, etc. In other words, the techniques may be effective even for images that do not contain many straight lines and/or lines representative of the horizon. For example, the techniques may accurately detect rotation errors in images consisting largely of curved, irregular lines in random directions and/or without any horizon lines or other lines from which a correctly-rotated position is readily discernible.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Certain relative terms used in this disclosure, such as, for example, "about," "substantially," "generally," and "approximately" are used to indicate a possible variation of ±10% of a stated or understood value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended figures, FIG. 1 shows an exemplary image that includes a horizon line, to which a horizon line detection technique may be applied to correct image rotation. A rotation angle of such an image may be detected using Hough transformation or canny edge detection algorithm to find the longest line in the image, and by bringing the detected horizon line to be parallel to the eye level. However, the horizon line detection technique may be effective only in images where horizon lines can be readily detected (e.g., sea images), meaning the technique may be ineffective in images with certain environmental constraints (e.g., foggy or cloud sky) or absence of any detectable horizon line.

Figure 2:
FIG. 2 shows an exemplary image that includes a plurality of line segments, to which a low-level line detection and camera calibration technique may be applied to correct image rotation.

FIG. 2 shows another exemplary image that includes a plurality of line segments, to which a low-level line detection and camera calibration technique may be applied to correct image rotation. This technique may leverage several criteria for quantitatively measuring the perceived quality of man-made structures or other image features. Particularly, a camera calibration technique may be employed to simultaneously estimate vanishing lines and points as well as camera parameters The estimated camera parameters and vanishing points and lines may then be processed using a reprojection technique. The reprojection technique may implement an energy minimization framework that computes an optimal homography to minimize the perceived distortion of slanted structures and other image features. While the technique may lead to good results with images containing straight line segments (e.g., man-made structures), it may not be effective against images lacking those properties.

Figure 3:
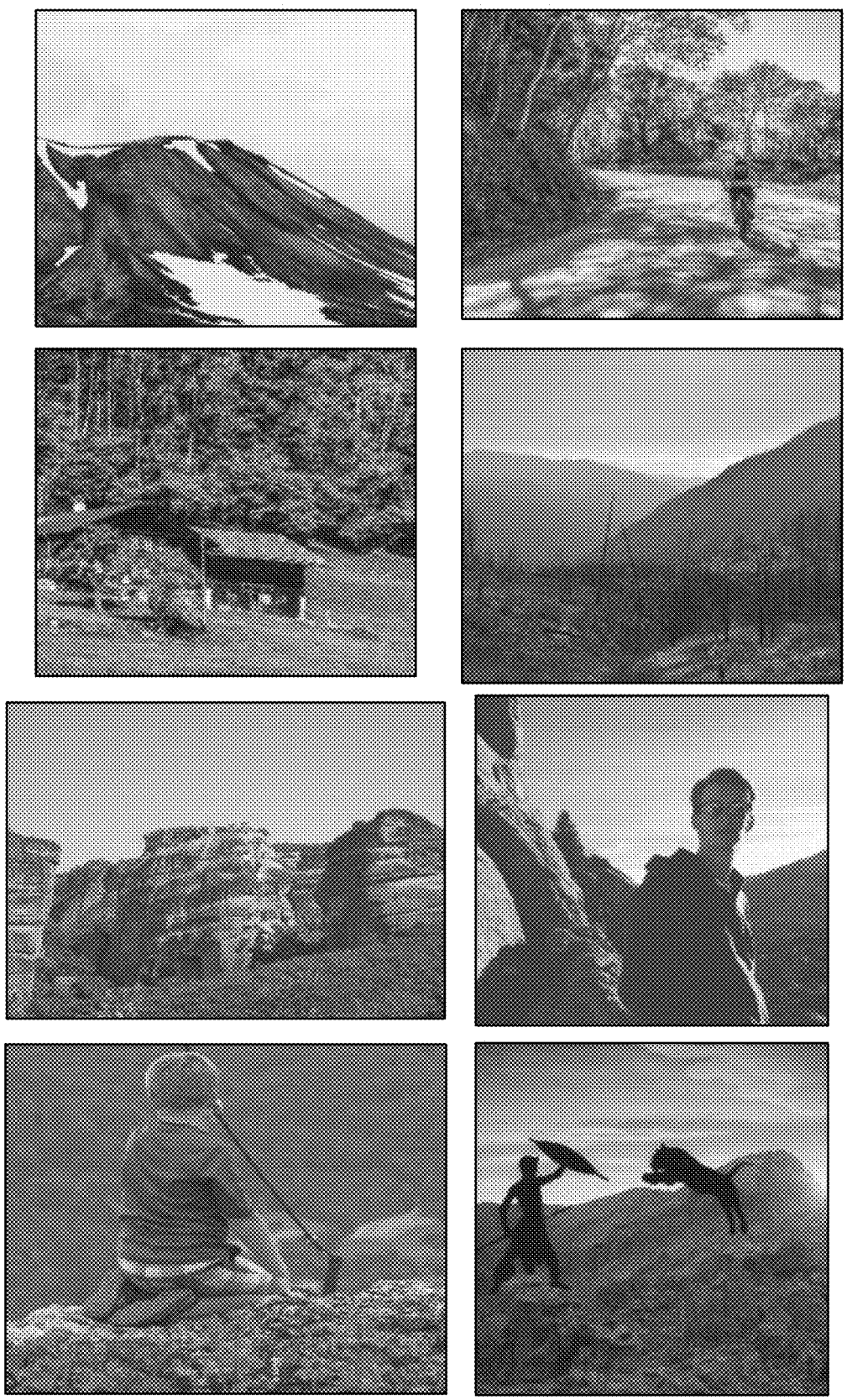
FIG. 3 shows exemplary images for which rotation correction might not be reliably achieved using the techniques explained in reference to FIGS. 1-2, and/or using other conventional techniques.

The techniques explained above in reference to FIGS. 1-2 (e.g., the horizon line detection technique and the low-level line detection and camera calibration technique) may not be suitable for calculating a rotation angle in images that do not have a lot of straight lines. For example, FIG. 3 shows exemplary images for which rotation correction might not be reliably achieved using the techniques explained in reference to FIGS. 1-2, and/or using other conventional techniques. The images in FIG. 3 do not contain many, if any, straight lines, and may largely comprise "natural" images such as landscapes, portraits, night photos, etc. The image rotation correction algorithm contemplated by the current disclosure may more reliably determine a rotation angle for a wider variety of images, including the images shown in FIG. 3 as well as those shown in FIGS. 1-2.

Figure 4:
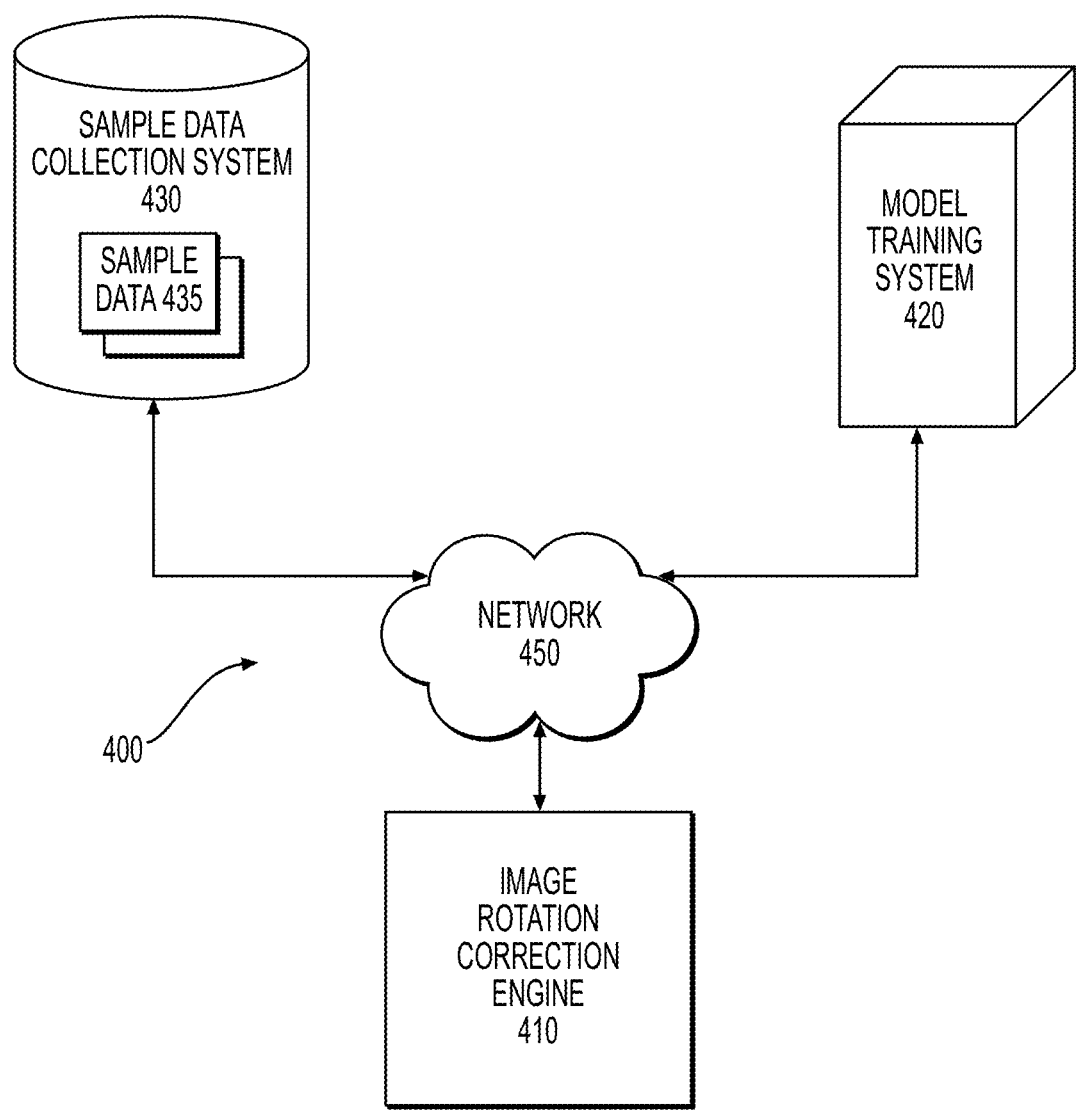
FIG. 4 shows an exemplary system infrastructure of an image rotation correction system, according to one aspect of the current disclosure.

FIG. 4 shows an exemplary system infrastructure of an image rotation correction system 400 comprising a user application, a training system, and a data collection system that are communicatively coupled. In general, the image rotation correction system 400 may comprise an image rotation correction engine 410, a model training system 420, and a sample data collection system 430, all connected via a network 450. The network 450 may include the Internet, but may also include other networks such as a corporate WAN, cellular network, satellite network, or combination thereof, for example. The network 450 may be employed to enable data communications between the various entities illustrated in FIG. 4.

Figure 10:
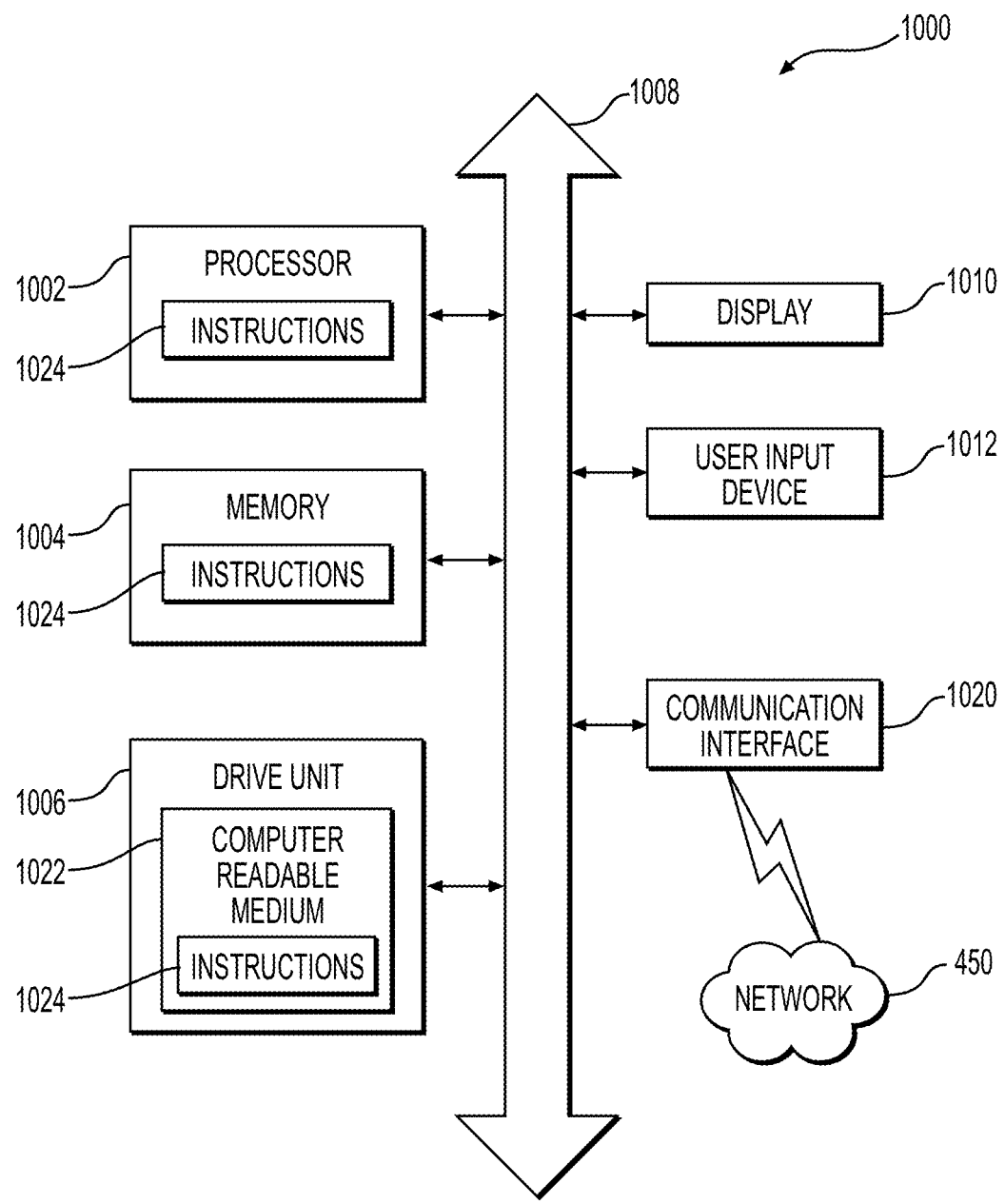
FIG. 10 illustrates an implementation of a computer system that may execute techniques presented herein.

The image rotation correction engine 410 may be part of a software application that is installed on any computing device consistent with or similar to that depicted in FIG. 10. For example, the image rotation correction engine 410 may be part of a photo editing software application, such as Adobe Photoshop or Lightroom. However, the image rotation correction engine 410 may be implemented with any software application in which a need for image rotation correction may arise, or may itself be a standalone application in connection with another software application in need of such image rotation correction and/or related parameters.

The image rotation correction engine 410 may use a trained machine learning model to detect a rotation angle and an orientation of an image, then rotate the image based on the detected rotation angle and orientation to "straighten" or put the image in an upright position. In the current disclosure, a rotation angle of an image refers to an angle representative of the "slant" or tilt exhibited by the image. Further, an orientation of an image refers to a direction (e.g., counterclockwise, clockwise, or neither) to which the image is "slanted" or "tilted." A combination of these parameters may be used to rotate an image to its upright position. In some embodiments, the image rotation correction engine 410 may merely calculate the rotation angle and orientation without actually correcting the image rotation. In other words, the image rotation correction engine 410 may output the rotation angle and orientation to a software application in need of such parameters and/or configured to correct image rotation based on such parameters.

The machine learning model used by the image rotation correction engine 410 may comprise a deep neural network. Particularly, the deep neural network may comprise a convolutional neural network (CNN). In general, the deep neural network contemplated in the current disclosure comprises one or more residual blocks (which comprises multiple layers of convolutions, normalization and activation layers placed upon each convolution), a pooling layer, and fully connected layers configured to determine a rotation angle and an orientation of an image. Further, an adapted loss function may optimize the model in view of prediction errors. The deep neural network will be described in greater detail below, particularly in reference to FIGS. 6-7.

With renewed reference to FIG. 4, the model training system 420 may comprise one or more computer servers consistent with or similar to that depicted in FIG. 10. The model training system 420 may comprise a single server, or a plurality of servers distributed across the network 450. Notably, the model training system 420 may receive sample data 435 from the sample data collection system 430 and may train a machine learning model based on the sample data 435. The model training system 420 may provide the trained machine learning model to the image rotation correction engine 410 to detect rotation angles and orientations associated with images input to the engine 410.

The sample data collection system 430 may comprise one or more computer servers consistent with or similar to that depicted in FIG. 10. The sample data collection system 430 may comprise a single server, or a plurality of servers distributed across the network 450. Notably, the sample data collection system 430 may collect and store sample data 435, which may be requested by and transmitted to the model training system 420. The sample data 435 may comprise sample images collected from one or more sources, to be used for model training. In one embodiment, the sample images may be collected from one or more sources comprising images that are already correctly rotated. In other words, the sample images may largely comprise ground truth data. For example, the sample images may be collected from the Pixabay web platform, and/or from other sources comprising images that have been corrected by annotators using photo/image editing software applications.

Upon receiving the sample data 435 from the sample data collection system 430, the model training system 420 may "prepare" the sample data 435 for model training. For example, the model training system 420 may perform image augmentation on each of the sample images contained in the sample data 435, and may also adjust the brightness and gamma levels of each of the sample images. The data preparation stage will be explained in greater detail below in reference to FIG. 5. The model training system 420 may then train the machine learning model using the prepared sample images.

Figure 5:
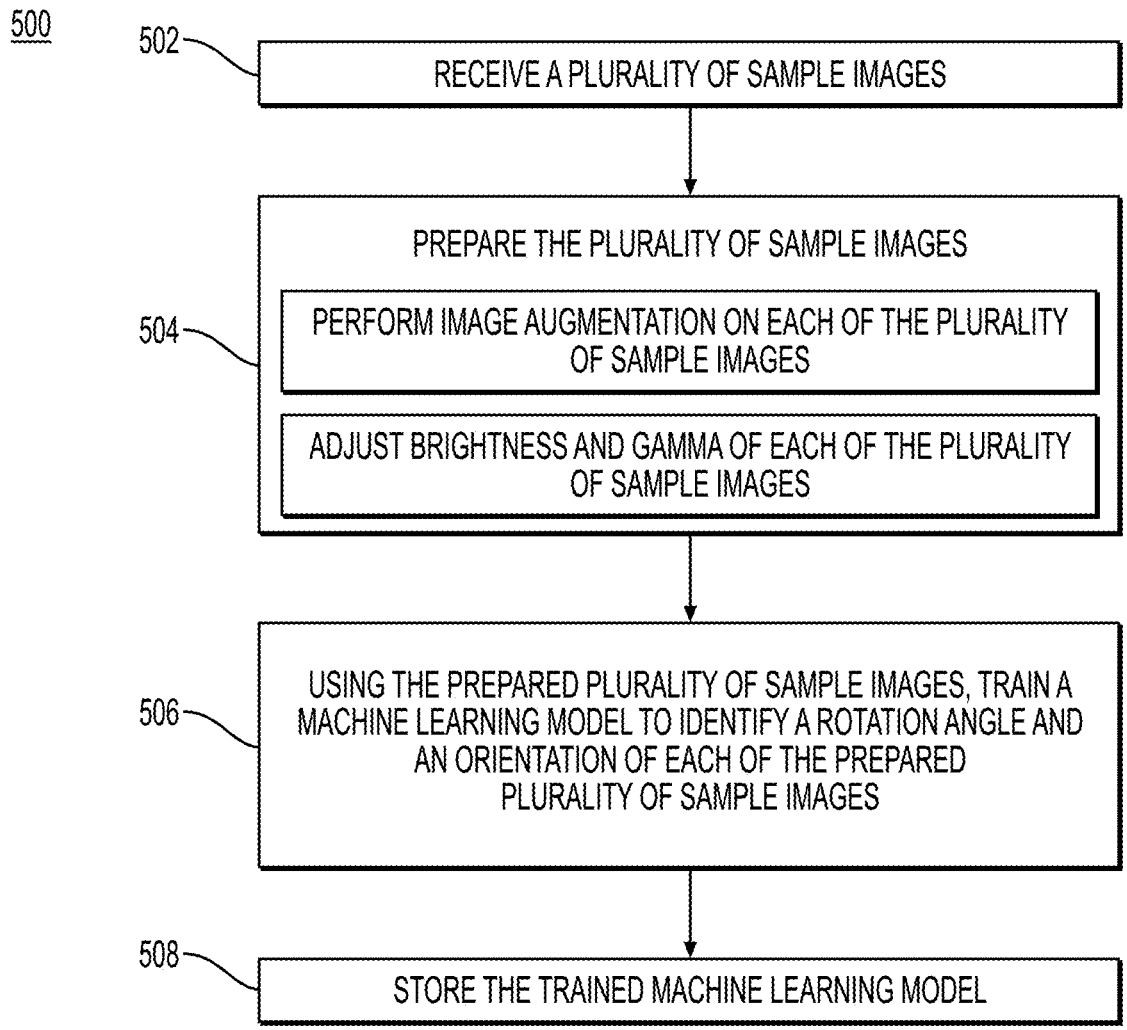
FIG. 5 is a flowchart illustrating an exemplary method of training a machine learning model, according to one aspect of the current disclosure.

FIG. 5 is a flowchart illustrating an exemplary method of training a machine learning model, according to one aspect of the current disclosure. Notably, method 500 may be performed by the model training system 420. At step 502, the model training system 420 may receive a plurality of sample images from one or more sample data sources (e.g., from the sample data collection system 430 or directly from one or more sources comprising sample images). As explained above, the received sample images may have already been corrected/adjusted to be in an upright position, and may thus serve as ground truth data (i.e., no rotation angle or orientation). Upon receiving the plurality of sample images, at step 504, the model training system 420 may prepare the plurality of sample images for model training.

A machine learning model that "overfits" may predict the training data (i.e., sample data) very well, but may perform poorly on data that the model has not seen or experienced previously. The problem of overfitting may be caused by designing the model to be too complex (e.g., a very deep or wide neural network) and/or when the quantity of training data is too low relative to the number of features processed by the model. In order to prevent overfitting, image augmentation may be performed on the received sample images as part of the data preparation stage by applying random transformations to the sample images. More particularly, each sample image may be rotated by a randomly-selected angle to a randomly-selected orientation. In one embodiment, the randomly-selected angle may range approximately from −12 degrees to +12 degrees. The positive or negative sign appended to the angle may indicate the orientation to which the sample image is rotated. For example, a positive sign may indicate that the image is rotated in a clockwise direction, while a negative sign may indicate that the image is rotated in a counterclockwise direction. However, it should be noted that the randomly-selected angle may not be necessarily limited to the range mentioned above, and a developer or programmer designing the model may configure any suitable range based on the performance of the model. Each augmented sample image may then be labeled to indicate the angle by which the image has been rotated and the orientation represented by the plus or minus sign of the angle. This dataset (i.e., augmented sample images) may be used to tune the model parameters and to compare the results of the current model to other baseline deep learning architectures.

In addition to applying random transformations to sample images, the model training system 420 may also adjust certain properties of the sample images before the training phase. For instance, the brightness and gamma levels of each sample image may be adjusted. In one embodiment, the brightness adjustment may range approximately from −0.01 to +0.01 and the gamma adjustment may range approximately from 0.7 to 1.4. However, it should be noted that the adjustment ranges may not be necessarily limited to these ranges, and a developer or programmer designing the model may configure any suitable range based on the performance of the model. Other preparation techniques may also be performed, such as cropping or resizing the images to a predefined dimension (e.g., 224×224 pixels, etc.), subtracting a mean pixel value from each pixel (i.e., centering) for each of red, green, and blue (RGB) channels, dividing RGB pixel values (i.e., RGB mean pixel values) into three separate channels, etc.

With continuing reference to FIG. 5, once the sample images are prepared, the model training system 420 may train a machine learning model using the prepared plurality of sample images, to identify a rotation angle and an orientation of each of the prepared plurality of sample images. As explained above, the machine learning model may be a deep neural network comprising a CNN. The proposed architecture may comprise one or more residual blocks each including multiple convolution layers, a global pooling layer, and fully connected layers comprising neurons configured to identify the rotation angle and orientation of each image, all connected in sequence. Further, a loss function may be adapted in order to compensate for any prediction errors and make the model more accurate by enabling the parameters to be adjusted to minimize the loss.

Figure 6:
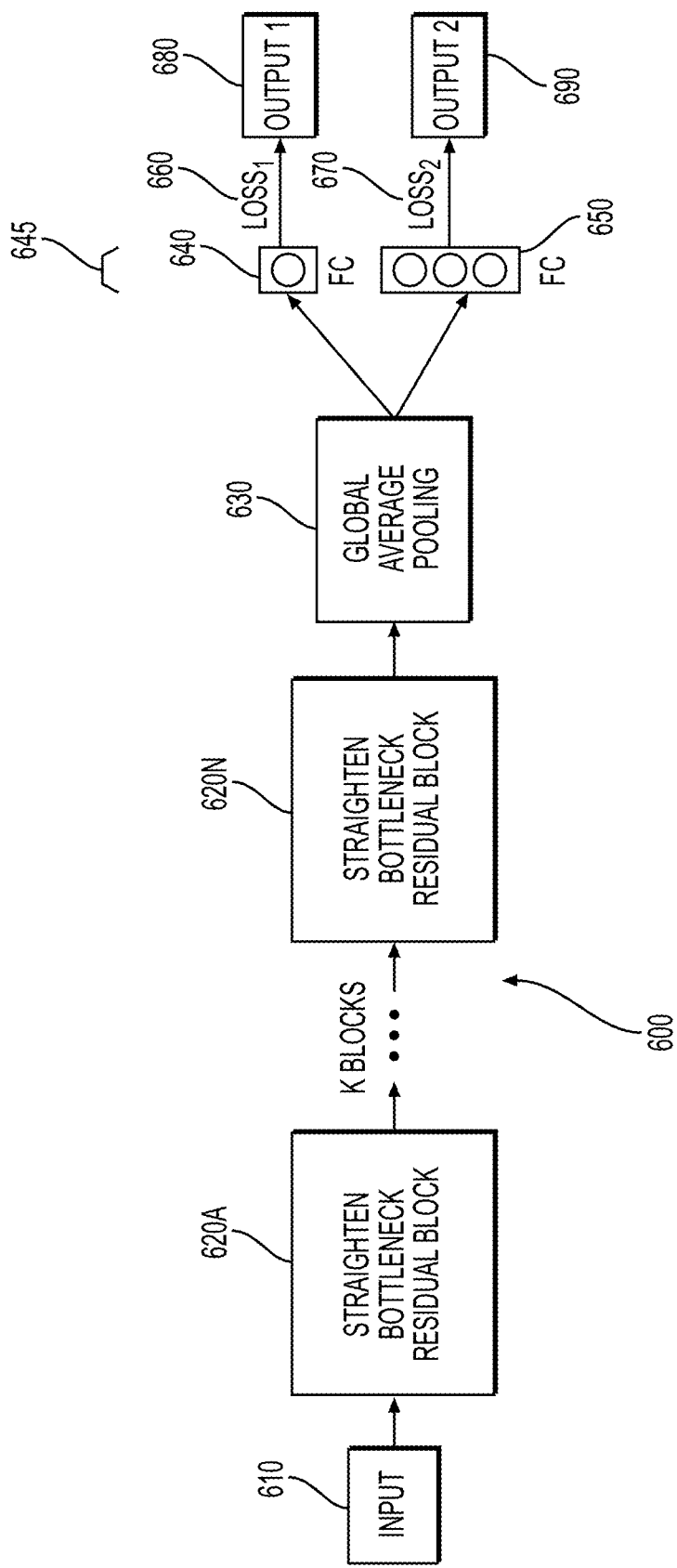
FIG. 6 depicts an exemplary machine learning model configured to identify a rotation angle and an orientation of an image, according to one aspect of the current disclosure.

FIG. 6 depicts an exemplary machine learning model configured to identify a rotation angle and an orientation of an image, according to one aspect of the current disclosure. The machine learning model may be a specially-designed deep neural network 600 comprising a CNN. In one aspect, the deep neural network 600 may utilize rectangle-shaped convolutions (i.e., filters), each having a dimension of M (height) by N (width). Compared to square-shaped filters used in other conventional CNN architectures, the rectangle-shaped filters may be better suited for detecting long horizontal lines, a capability that is extremely important in detecting a rotation angle as well as an orientation of an image. Further, a loss function may be adapted in the network 600, forcing the network 600 to more strongly penalize incorrect predictions.

In general, the deep neural network 600 contemplated by the current disclosure comprises one or more straighten bottleneck residual blocks 620A-620N configured to extract features from an image, a global average pooling layer 630, and an artificial neural network 645 comprising i) a first branch 640 of a fully connected layer configured to determine a rotation angle, i.e., output 1 680, and ii) a second branch 650 of a fully connected layer configured to determine an orientation, i.e., output 2 690. Additionally, a loss function comprising a regression loss 660 and a classification loss 670 may be adapted at the end of the network 600, such that the outputs 680 and 690 are evaluated against the ground truth data (i.e., sample data 435) and the degree of deviation from the ground truth data may be reflected upon the network 600 as an error, "steering" the network 600 in the right direction.

Figure 7:
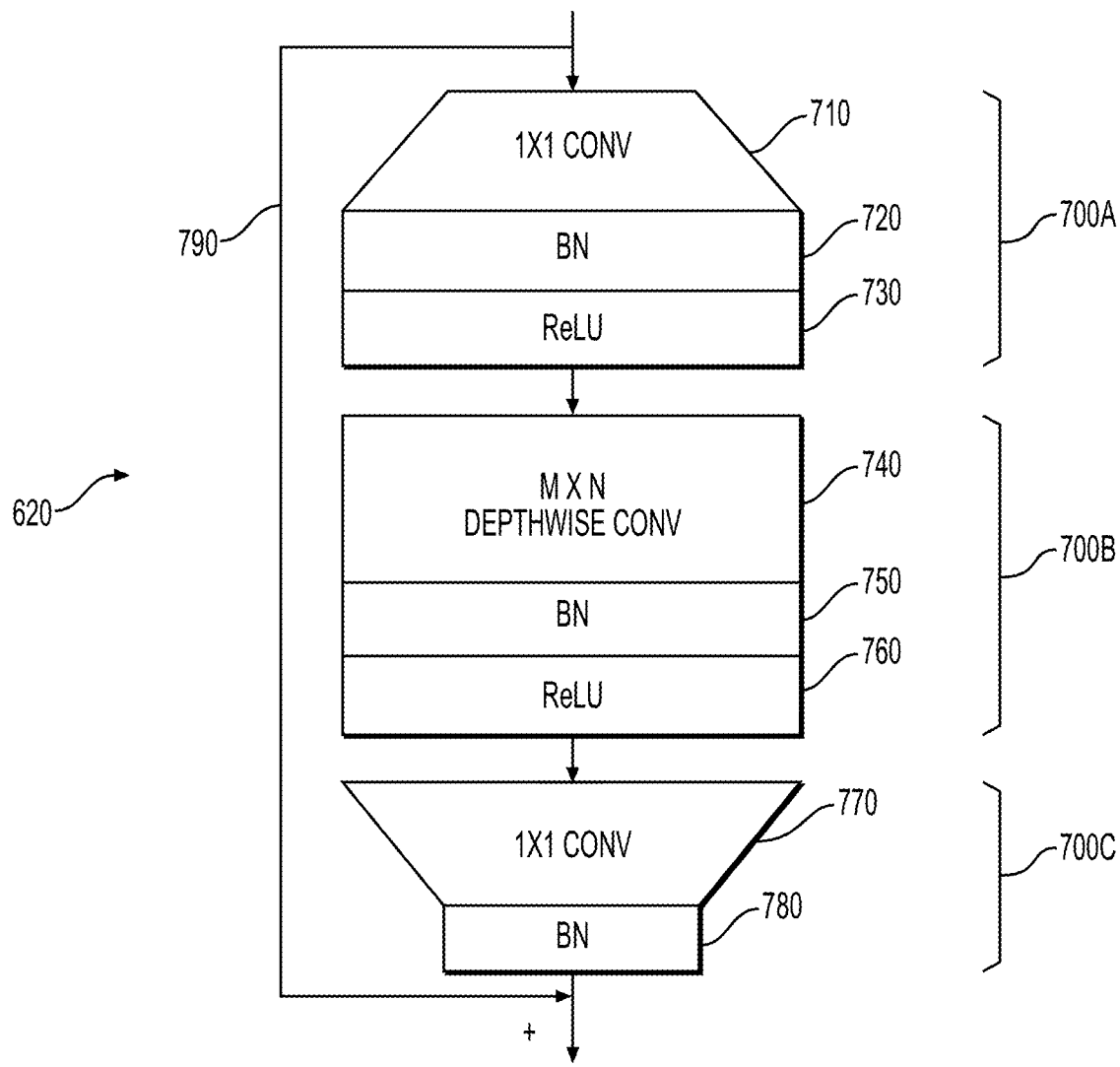
FIG. 7 is a detailed illustration of an exemplary flow of a straighten bottleneck residual block, according to one aspect of the current disclosure.

A detailed architecture of each of the straighten bottleneck residual blocks 620A-620N will now be discussed. Residual networks such as the ones depicted in FIG. 6 may be used to solve a vanishing gradient problem, which becomes more likely to happen as more layers are added to a neural network (i.e., as the network becomes deeper or wider). In a residual network or block, a shortcut that skips one or more layers is added to the block, changing the way the gradient is calculated at each layer. For example, FIG. 7 is a detailed illustration of an exemplary straighten bottleneck residual block 620 comprising a skip connection 790 (i.e., a shortcut 790). Training of one or more layers within the residual block 620 may be skipped using the skip connection 790. For instance, passing the input straight to the output as shown in FIG. 7 may prevent the layers 700A-700C from changing the gradient value. As the model is being trained, different parts of the network will be trained at different rates based on how the error (i.e., loss) flows backwards in the network. In general, an optimal number of layers (or residual blocks) required for a neural network may depend on the complexity of the data set, and may not be apparent initially. By adding skip connections, the network may be designed to skip training for the layers that are not useful and do not add value in overall accuracy. Therefore, skip connections may make the network dynamic, meaning the network may optimally tune the number of layers during training.

With continuing reference to FIG. 7, a straighten bottleneck residual block 620 may comprise a skip connection 790 as discussed above, a first layer 700A, a second layer 700B, and a third layer 700C. The first layer 700A may comprise a 1×1 convolution (i.e., filter or kernel) 710. The purpose of the 1×1 convolution 710 in the first layer 700A may be to expand the number of channels in the data input to the block 620 (i.e., increase the depth of the image), prior to the data being processed by a depthwise convolution. The use of the 1×1 convolution 710 prior to a depthwise convolution may enable computation of more complex features and finer representations of the processed data. A batch normalization 720 may be performed on the output of the 1×1 convolution 710, resulting in faster and more stable training as well as some regularization effect. Once the batch normalization 720 is performed, a non-linear activation function 730 such as, e.g., Rectified Linear Unit (ReLU) activation, may be applied to increase the non-linearity in the output, namely, a feature map. The resultant feature map may then be input to the second layer 700B.

The second layer 700B may comprise a depthwise convolution 740, more specifically, an M×N convolution that is rectangle-shaped with a height being smaller than a width (i.e., M<N). As alluded to above, a rectangle-shaped convolution may have distinct advantages over a square-shaped convolution for detecting image rotation errors, and may be better suited for detecting long lines in an image. Similar to the first layer 700A, a batch normalization 750 may be performed on the output of the depthwise convolution 740. Once the batch normalization 750 is performed, a non-linear activation function 760 such as, e.g., ReLU activation, may be applied. The resultant feature map may then be input to the third layer 700C.

The third layer 700C may comprise a 1×1 convolution 770, similar to the one in the first layer 700A. However, the purpose of the 1×1 convolution 770 in the last layer 700C may be to reduce the number of channels in the output layer (i.e., reduce the depth of the image), in order to reduce the number of parameters and computation costs. Upon applying the 1×1 convolution 770, a batch normalization 780 may be performed on the output of the 1×1 convolution 770. In the third (i.e., last) layer 700C, a linear activation may be preferred over a non-linear activation 760. The resultant feature map may then be processed by a next component of the network 600. Other hyperparameters pertaining to the convolutions 710, 740, and 770 such as, e.g., stride and padding sizes, may be configured and adjusted by a developer or programmer of the deep neural network 600 based on its performance.

With renewed reference to FIG. 6, an input 610 (i.e., an image) may be provided to the first of the straighten bottleneck residual blocks 620A-620N (i.e., the straighten bottleneck residual block 620A). A predefined number of straighten bottleneck residual blocks may be "chained," or connected one after another. In one embodiment, the predefined number, K, may be 16, meaning 16 straighten bottleneck residual blocks may exist in the deep neural network 600. However, the number of residual blocks may not be limited to 16, and may be adjusted to be lower or higher than 16 based on evaluating the performance of the deep neural network 600.

A global average pooling layer 630 may connected to the last of the straighten bottleneck residual blocks 620A-620N (i.e., the straighten bottleneck residual block 620N) and may be fed the output (i.e., feature map) of the straighten bottleneck residual block 620N. The hyperparameters of the pooling layer 630 may be configured based on the design and performance of the deep neural network 600. For example, the pooling layer 630 may utilize a filter of size 2 and stride 2. However, the filter and stride sizes are not limited to the values specifically mentioned herein, and may be configured differently. The pooling layer 630 may contribute to the accuracy of the network 600 by making some of the detected features more robust, and to the speed of computation by reducing the number of features to be processed. In the deep neural network 600 contemplated by the current disclosure, average pooling may be preferred over max pooling as depicted in FIG. 6 (i.e., global average pooling 630), although the pooling layer may not necessarily be limited to such pooling method.

With continuing reference to FIG. 6, an artificial neural network 645 comprising two branches of fully connected layers may be added adjacent the global average pooling layer 630. In other words, the output of the global average pooling layer 630 (i.e., a pooled feature map) may be fed into the two branches of fully connected layers. First, the pooled feature map may be flattened to a vector (i.e., a sequential column of values). The vector may then be fed to a fully connected layer such that the vector captures complex relationships between high-level features. The first branch 640 may comprise a fully connected layer with a single neuron (i.e., a first neuron) configured to predict a rotation angle of an image (i.e., the input 610), and the second branch 650 may comprise a fully connected layer with a set of neurons (i.e., second neurons) configured to predict an orientation (i.e., one of counterclockwise, clockwise, or no orientation) of the image.

In the first branch 640, the first neuron may be a linear neuron, and may perform a regression task of predicting a rotation angle of an image. A linear activation function, or no activation function, may be applied in the first branch 640, as the first branch 640 is configured to solve a regression problem. In the second branch 650, the second neurons may perform a classification task by determining the probabilities of the image being oriented counterclockwise, clockwise, and substantially upright (i.e., no orientation). The orientation with the highest probability may be selected as the output. Three neurons may exist in the second branch 650, each of the three neurons representing a classification label indicative of its respective orientation. A non-linear activation function may be applied in the second branch 650, such as, e.g., softmax activation function, in order to transform an output of multiple units of the fully-connected layer to a probability distribution, which may be represented as a vector of multiple elements, each of which is between 0 and 1 and the sum of all these elements being 1.

With continuing reference to FIG. 6, loss functions may be applied once the rotation angle (i.e., output 1 680) and the orientation (i.e., output 2 690) are determined by the artificial neural network 645. A total loss of the deep neural network 600 may be the sum of a regression loss 660 and a classification loss 670. In other words, losses may be calculated for both the regression task of the first branch 640 and the classification task of the second branch 670. A loss function for each task may map a set of parameter values (e.g., weights) for the network 600 onto a scalar value that indicates how well those parameters accomplish the task. A loss function may thus be used to optimize the parameter values of the network 600 by identifying the difference between the network output and its expected output and enabling back-propagation.

As explained above, the total loss may comprise the regression loss 660 and the classification loss 670, and the individual losses may be multiplied by a weighing coefficient to calculate the total loss. For example, the total loss may be characterized by the following equation:

$$\text{Loss} = w_1 \text{Loss}_1 + w_2 \text{Loss}_2$$

In one embodiment, the weighing coefficient ($w_1$) for the regression loss ($Loss_1$) may be set at 0.75 and the weighing coefficient ($w_2$) for the classification loss ($Loss_2$) may be set at 0.25, penalizing the regression loss more heavily than the classification loss. However, the values of the weighing coefficients may not be limited to this specific example, and may be varied and configured by the developer of the network 600.

The classification loss ($Loss_2$) may be represented by a cross-entropy loss, which can be characterized by the equation below:

$$H(p, q) = -\sum_{x \in X} p(x) \log q(x)$$

A cross-entropy loss may measure the performance of a classification task whose output is a probability value between 0 and 1. In the above equation, p may be the true label distribution and q may be the predicted label distribution. Accordingly, p(x) may represent the probability of event x in the true label distribution, and q(x) may represent the probability of event x in the predicted label distribution. The cross-entropy loss may thus increase as the predicted probability diverges from the actual label.

The regression loss ($Loss_1$) may comprise three (3) terms, as shown in the equation below:

$$Loss1 = \frac{1}{N}\sum_{c=1}^{N}(y_i - y_{pi})^2 + \frac{\gamma_1}{N}\sum_{c=1}^{N}\min(0, y_i, y_{pi})^2 + \gamma_2 \|w\|^2$$

The first term may comprise a mean squared error representative of the degree of difference between the predicted rotation angle $y_{pi}$ and the true rotation angle $y_i$ (i.e., the rotation angle reflected in the ground truth data). The second term, with $\gamma_1$ being the corresponding weight, may comprise an orientation loss configured to penalize orientation errors that are most disturbing. For instance, when $y_i$ and $y_{pi}$ have different signs, meaning they represent different orientations, the product of the two values will be less than 0 and, when squared, the loss will increase even further. On the other hand, when the two values have the same sign, meaning they represent the same orientation, their product will be positive and the loss will not increase. The variable N in the above equation represents the batch size. The third term, with $y_2$ being the corresponding weight, may comprise a regularization component configured to penalize the large weights of the coefficients to reduce the overfitting of the training dataset. $\|w\|^2$ in the third term represents the sum of the squared values of the weights (i.e., L2 Regularization or Ridge Regularization). Large weights make the network unstable because minor variation or statistical noise on the expected inputs will result in large differences in the output. Smaller weights are considered more regular or less specialized. In one embodiment, the values for the variables N, $y_1$, and $y_2$ may be 32, 1, and 0.01, respectively. However, it should be noted that the values may be configured differently depending on the performance of the network 600.

Referring now back to FIG. 5, the training phase at step 506 may utilize a setup comprising an open-source neural network library such as, e.g., Keras, and an optimizer for compiling the model such as, e.g., RMSProp optimizer. Both decay and momentum may be set to 0.9. The learning rate may be set to $10^{-3}$ and the number of epochs may be set to 50. The learning rate may decrease on each epoch using a standard weight decay set to 1/N, where 1 represents the learning rate and N represents the number of epochs. However, one of ordinary skill in the art will recognize that the training setup may not be limited to the aforementioned configurations, and may be configured differently depending on developer preferences, model performance, etc.

At step 508, the model training system 420 may store the trained machine learning model in a remote or local storage. The trained machine learning model may later be transmitted or made available to the image rotation correction engine 410 to automatically correct image rotation.

Figure 8:
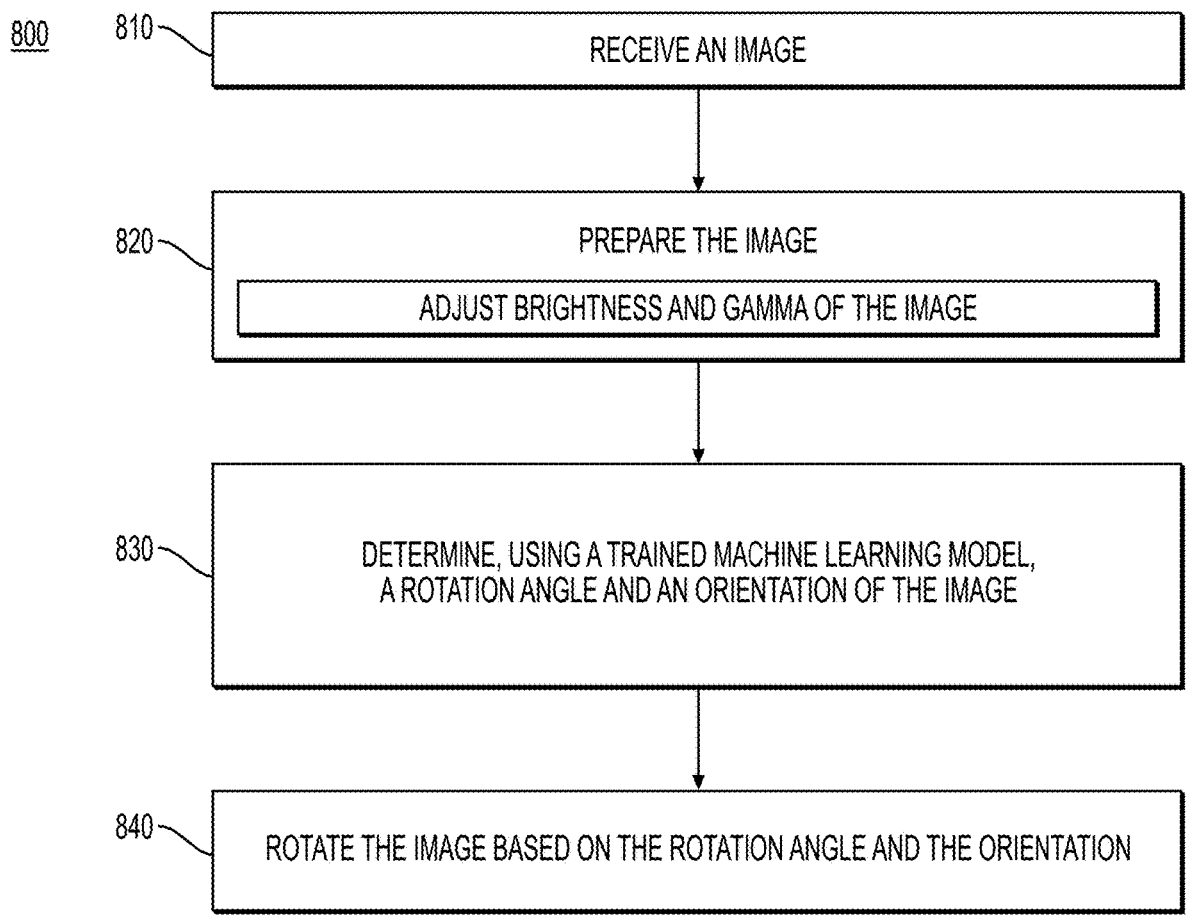
FIG. 8 is a flowchart illustrating an exemplary method of automatically correcting a rotation of an image, according to one aspect of the current disclosure.

FIG. 8 is a flowchart illustrating an exemplary method of automatically correcting a rotation of an image, according to one aspect of the current disclosure. Method 800 may be performed by the image rotation correction engine 410. At step 810, the image rotation correction engine 410 may receive an image. The image may have been selected by a user for rotation correction, or may have been automatically selected by the engine 410 or a software application working in conjunction with the engine 410. At step 820, the image rotation correction engine 410 may prepare the image prior to providing (i.e., feeding) it to the machine learning model trained in accordance with method 500. In one embodiment, the image rotation correction engine 410 may adjust certain properties of the image in preparation for the prediction phase. For instance, the brightness and gamma levels of each image may be adjusted to the same levels configured at the preparation stage for model training (i.e., step 504 in method 500). Other preparation techniques may also be performed, such as cropping or resizing the images to a predefined dimension (e.g., 224×224 pixels, etc.), subtracting a mean pixel value from each pixel (i.e., centering) for each of red, green, and blue (RGB) channels, dividing RGB pixel values (i.e., RGB mean pixel values) into three separate channels, etc.

At step 830, the image rotation correction engine 410 may determine a rotation angle and an orientation of the image, by inputting the prepared image to the trained machine learning model (i.e., the machine learning model trained in accordance with method 500). As discussed above, the trained machine learning model may comprise the architecture illustrated in FIGS. 5-6. By the artificial neural network 645 added at the end of the deep neural network 600, the rotation angle and orientation of the image may be predicted. At step 840, the image rotation correction engine 410 may correct image rotation by rotating the image based on the determined rotation angle and orientation. Specifically, the image may be rotated by the determined rotation angle to a direction opposite to the determined orientation. For example, if the rotation angle and orientation of the image have been determined to be 45 degrees in a clockwise direction, the image may be rotated by 45 degrees in a counterclockwise direction, for the image to be in a straightened or an upright position.

To test the effectiveness of the image rotation correction algorithm contemplated by the current disclosure (referred to as the current image rotation correction algorithm hereinafter), the current image rotation correction algorithm was compared with other possible image rotation correction algorithms that utilize baseline deep learning architectures. These baseline architectures included Inception V3, DenseNet 121, Mobilenet V2, and Resnet 50. The goal of this experiment was to demonstrate that the current image rotation correction algorithm leads to substantial improvement in automatically correcting image rotation problems. The performance was assessed with two metrics: i) a mean absolute error (MAE) representative of the mean of absolute angle errors and ii) an accuracy value representative of the percentage of predictions that have an angle error of less than 1 degree. The experiments were conducted on the sample data 435, the same dataset used for training the deep neural network 600. For each of the baseline deep learning architectures, the last layers were replaced by a global average pooling and a dense layer with linear activation, and the mean squared error was used as the loss function. The results indicated that the current image rotation correction algorithm resulted in significant improvements over those using the baseline architectures, as provided below in Table 1.

TABLE 1

| Architecture | Accuracy | MAE |
| --- | --- | --- |
| Mobilenet V2 | 75.07% | 1.04 |
| Resnet 50 | 67.75% | 1.98 |
| DenseNet 121 | 77.55% | 1.12 |
| Inception V3 | 57.26% | 1.98 |
| Current | 98.36% | 0.21 |

In addition to the above experiment, the current image rotation correction algorithm was compared with the image rotation correction algorithm discussed in reference to FIG. 2, which is designed to correct image rotation using a low-level line detection and camera calibration technique (referred to as the state-of-the-art algorithm hereinafter). The experiment was performed based on parameters and methodology similar to those used in the previous experiment. However, the experiment was performed on a new dataset (i.e., different from the sample date 435) representative of a larger variety of images with rotation angles ranging approximately from −25 degrees to +25 degrees. The new dataset contained images from various categories, such as cities, landscapes, portraits, sports, night images, etc. The purpose of the new dataset was to create a comprehensive experiment that can provide a meaningful comparison with the state-of-the-art algorithm. Similar to the previous experiment, the performance was assessed based on two metrics: i) a mean absolute error (MAE) representative of the mean of absolute angle errors and ii) an accuracy value representative of the percentage of predictions that have an angle error of less than 1 degree. The results showed the remarkable generalization capability of the current image rotation correction algorithm with respect to the new dataset comprising a large variety of images. The use of the deep neural network 600 in image rotation correction significantly improved the MAE and accuracy, yielding much better results than the state-of the-art algorithm. The quantitative results of the current image rotation correction algorithm compared to the state-of-the-art algorithm are shown below in Table 2.

TABLE 2

| Architecture | Accuracy | MAE |
| --- | --- | --- |
| State-of-the-art | 39.53% | 6.4 |
| Current | 92.46% | 0.62 |

Figure 9:
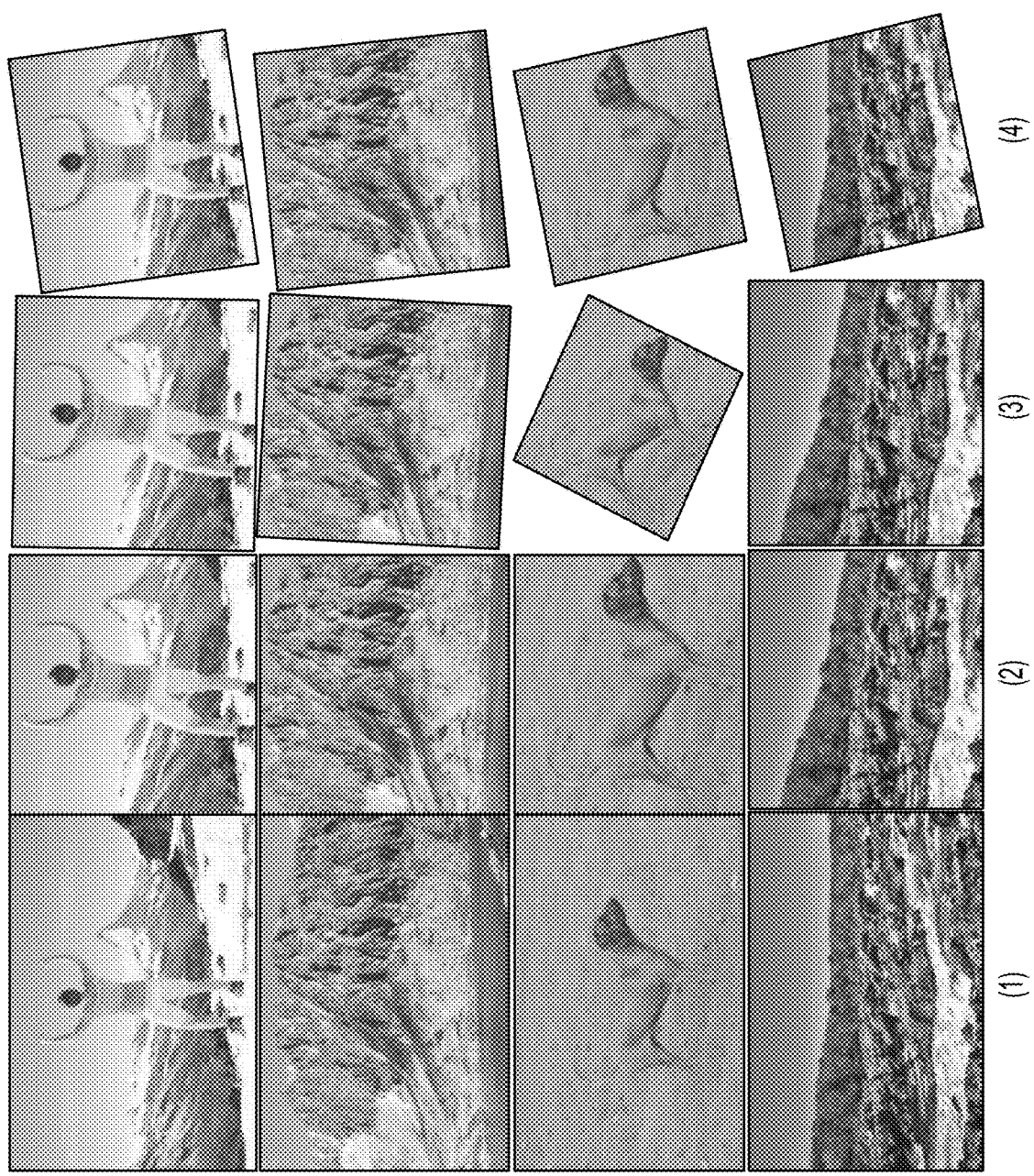
FIG. 9 shows qualitative results obtained with an exemplary image rotation correction algorithm contemplated by the current disclosure, relative to those of a comparable algorithm.

Further, FIG. 9 shows the qualitative results obtained with the current image rotation correction algorithm for certain challenging images from different categories, compared to those of the state-of-the-art algorithm. The first column in the array of images in FIG. 9 shows ground truth input images. The second column shows images that have been rotated from the ground truth input images (i.e., augmented images). The third column shows images that have been corrected utilizing the state-of-the-art algorithm, and the fourth column shows images that have been corrected by the current image rotation correction algorithm. As evident in the images shown in FIG. 9, the images corrected by the current image rotation correction algorithm are much closer, if not identical, to the ground truth images. On the other hand, the state-of-the-art algorithm appears relatively ineffective in correcting the rotation of the various images shown in FIG. 9, as the images corrected by the state-of-the-art algorithm still appear tilted relative to the ground truth images.

A single forward pass of the deep neural network 600 may take approximately 26 milliseconds for an image having a resolution of 840×840 pixels, using a suitable processor. Based on the processing speed achieved by the proposed model, the current image rotation correction algorithm may be used in real-time applications such as video stabilization. For example, the proposed model will successfully generalize to video files and videos captured with a webcam or a portable camera, including a camera implemented in a mobile phone. Therefore, data processed by the current image rotation correction algorithm may comprise images extracted from video frames as well as still images.

The current disclosure introduces a deep neural network architecture that automatically corrects image rotation solely based on visual data. Notably, the following improvements and/or contributions are made by the proposed architecture: a fast deep learning representation for addressing the problem of rotation correction in images and videos; straighten bottleneck residual blocks adapted for detecting long lines in images using rectangle-shaped filters; a loss function designed to reduce rotation and orientation errors; an image correction algorithm applicable to a wide range of images with high accuracy; an image correction algorithm leading to better rotation angle and orientation detection compared to other conventional and state-of-the-art algorithms; and a deep learning architecture that is suitable for use in portable devices.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 10 illustrates an implementation of a computer system that may execute techniques presented herein. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may further include a display unit 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control, or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g. software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 450 can communicate voice, video, audio, images, or any other data over the network 450. Further, the instructions 1024 may be transmitted or received over the network 450 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 450, external media, the display 1010, or any other components in system 1000, or combinations thereof. The connection with the network 450 may be a physical connection, such as a wired Ethernet connection or may be established wirelessly as discussed below. Likewise, the additional connections with other components of the system 1000 may be physical connections or may be established wirelessly. The network 450 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 450. The network 450 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 450 may include wide area networks (WAN), such as the Internet, local area networks (LAN), campus area networks, metropolitan area networks, a direct connection such as through a Universal Serial Bus (USB) port, or any other networks that may allow for data communication. The network 450 may be configured to couple one computing device to another computing device to enable communication of data between the devices. The network 450 may generally be enabled to employ any form of machine-readable media for communicating information from one device to another. The network 450 may include communication methods by which information may travel between computing devices. The network 450 may be divided into sub-networks. The sub-networks may allow access to all of the other components connected thereto or the sub-networks may restrict access between the components. The network 450 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for automatically correcting a rotation of an image, the method comprising:
   receiving an input image to be processed for rotation correction;
   providing the input image to a machine learning model configured to predict a rotation angle and an orientation of an image, the machine learning model comprising a convolutional neural network utilizing one or more rectangle-shaped filters;
   determining a rotation angle of the input image using a first branch of fully connected layer configured for a regression task of the machine learning model;
   determining an orientation of the input image using a second branch of fully connected layer configured for a classification task of the machine learning model; and
   rotating the input image based on the determined rotation angle and orientation.

2. The computer-implemented method of claim 1, further comprising:
   receiving a plurality of sample images, the plurality of sample images comprising ground truth data;
   augmenting by the plurality of sample images by rotating each of the plurality of sample images by a randomly-selected angle in a randomly-selected orientation; and
   training the machine learning model by providing each of the plurality of augmented sample images to the machine learning model,
   wherein the ground truth data comprises images that are correctly rotated.

3. The computer-implemented method of claim 1, further comprising, prior to providing the input image to the machine learning model:
   adjusting a brightness level of the input image to a predefined brightness level; and
   adjusting a gamma level of the input image to a predefined gamma level.

4. The computer-implemented method of claim 1, wherein each of the one or more rectangle-shaped filters has a dimension of M by N.

5. The computer-implemented method of claim 1, wherein the machine learning model comprises:
   a first loss function configured to penalize a prediction error associated with a rotation angle predicted for an image; and
   a second loss function configured to penalize a prediction error associated with an orientation predicted for an image.

6. The computer-implemented method of claim 5, wherein the first loss function is a regression loss function.

7. The computer-implemented method of claim 5, wherein the first loss function comprises one or more of:
   a mean squared error based on a difference between a predicted rotation angle and an actual rotation angle;
   an orientation loss based on a difference between a predicted orientation and an actual orientation; and
   a regularization term.

8. The computer-implemented method of claim 5, wherein the second loss function is a classification loss function.

9. The computer-implemented method of claim 1, wherein the input image to be processed for rotation correction is extracted from a video frame or a still image.

10. A computer-implemented method for automatically correcting a rotation of an image, the method comprising:
    receiving an input image to be processed for rotation correction;
    preparing the input image for feature extraction;
    extracting a plurality of features from the input image using a machine learning model comprising one or more straighten bottleneck residual blocks, each of the one or more straighten bottleneck residual blocks comprising a rectangle-shaped filter;
    determining a rotation angle of the input image based on the plurality of extracted features using a first branch of fully connected layer of the machine learning model;
    determining an orientation of the input image based on the plurality of extracted features using a second branch of fully connected layer of the machine learning model; and
    rotating the input image based on the determined rotation angle and orientation.

11. The computer-implemented method of claim 10, wherein preparing the input image for feature extraction comprises one or more of:
    resizing the input image to a predefined dimension;
    for each of red, green, and blue channels of the input image, determining a mean pixel value of each of a plurality of pixels in the input image;
    adjusting a brightness level of the input image to a predefined brightness level; and
    adjusting a gamma level of the input image to a predefined gamma level.

12. The computer-implemented method of claim 10, wherein the machine learning model comprises a convolutional neural network utilizing the one or more straighten bottleneck residual blocks.

13. The computer-implemented method of claim 10, wherein each of the one or more straighten bottleneck residual blocks comprises a plurality of filters including the rectangle-shaped filter.

14. The computer-implemented method of claim 10, wherein each of the one or more straighten bottleneck residual blocks comprises:
a first layer including a 1×1 filter;
a second layer subsequent to the first layer, the second layer including the rectangle-shaped filter;
a third layer subsequent to the second layer, the third layer including a 1×1 filter; and
a skip connection.

15. The computer-implemented method of claim 10, wherein the rectangle-shaped filter has a dimension of M by N.

16. The computer-implemented method of claim 10, wherein the first branch of fully connected layer uses linear activation and the second branch of fully connected layer uses non-linear activation.

17. The computer-implemented method of claim 16, wherein the non-linear activation uses a softmax activation function.

18. The computer-implemented method of claim 10, wherein the orientation indicates one of: a clockwise direction, a counterclockwise direction, or none.

19. The computer-implemented method of claim 10, wherein rotating the input image based on the determined rotation angle and orientation comprises:
rotating the input image by the determined rotation angle in a direction opposite to the determined orientation.

20. A system for automatically correcting a rotation of an image, the system comprising:
one or more processors; and
one or more computer readable media storing instructions which, when executed by the one or more processors, cause the one or more processors to perform operations comprising:
receiving an input image to be processed for rotation correction;
providing the input image to a machine learning model configured to predict a rotation angle and an orientation of an image, the machine learning model comprising a convolutional neural network utilizing one or more rectangle-shaped filters;
determining a rotation angle of the input image using a first branch of fully connected layer configured for a regression task of the machine learning model;
determining an orientation of the input image using a second branch of fully connected layer configured for a classification task of the machine learning model; and
rotating the input image based on the determined rotation angle and orientation.

\* \* \* \* \*